United States Patent Office 2,830,681
Patented Apr. 15, 1958

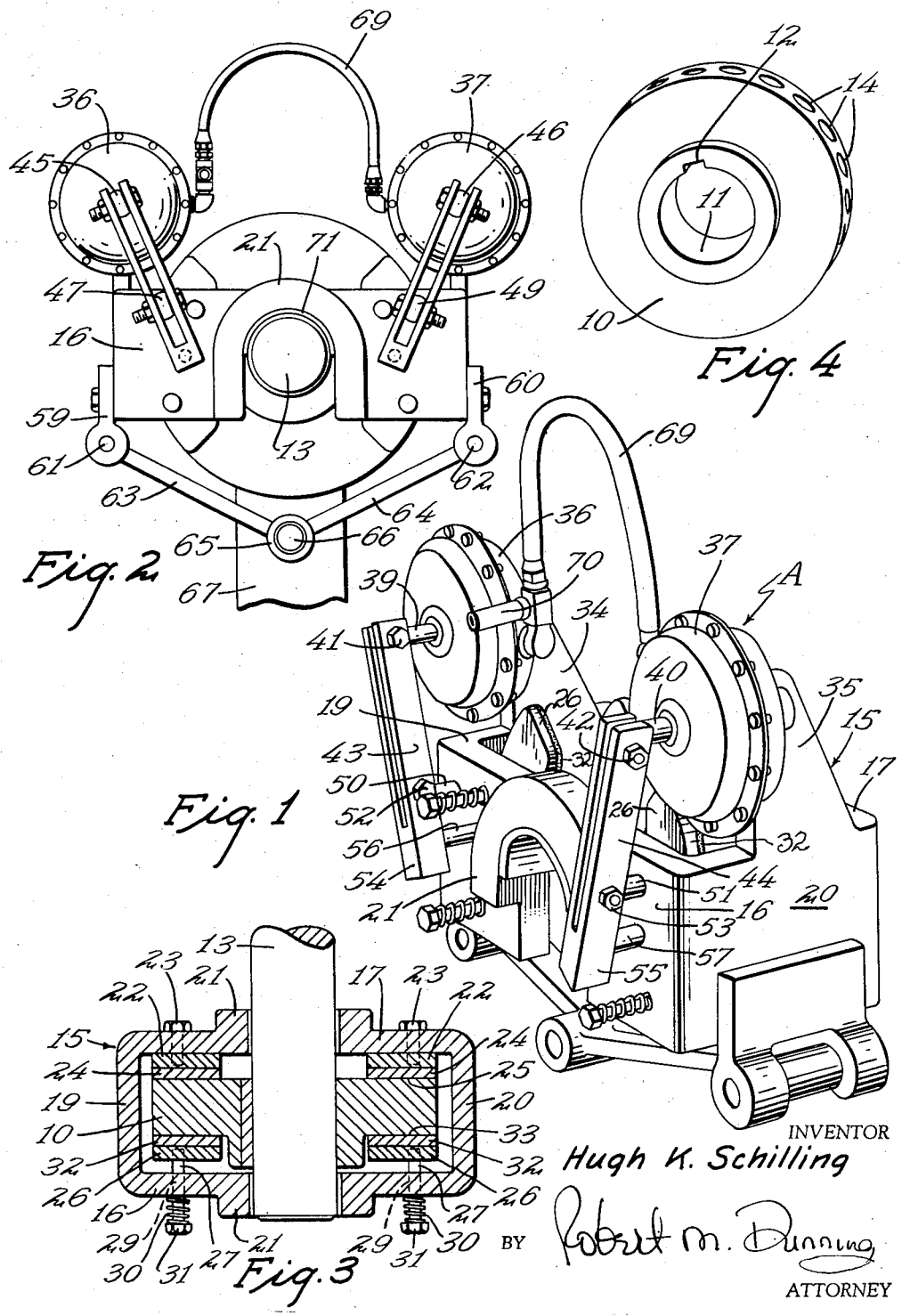

2,830,681
DISC BRAKES

Hugh K. Schilling, Minneapolis, Minn., assignor to Horton Manufacturing Co., Inc., a corporation of Minnesota Application September 30, 1955, Serial No. 537,851

8 Claims. (Cl. 188—72)

This invention relates to an improvement in disc brakes and deals particularly with a brake of the type employed to resist rotation of a shaft.

In various operations it is desirable to provide a disc brake for the purpose of supplying friction capable of resisting the rotation of a shaft. For example, in the process of laminating webs of paper together it is usual practice to mount the rolls of papers to be united on separate shafts in passing the webs between rollers which act to pull the paper from the rolls. In order to control the tension in the sheet, a brake is employed upon the shafts on which the paper rolls are mounted. The present invention deals with an apparatus for accomplishing this general result.

An object of the present invention resides in the provision of a disc brake including a revolvable disc and brake shoes mounted on opposite sides of said disc. By applying pressure against one pair of brake shoes these shoes are forced against the disc and the disc is forced against the second set of shoes located on the opposite side of the disc. Thus the rotation of the disc is resisted by the friction applied.

A feature of the present invention resides in the provision of a pair of levers which are used for applying axial pressure against one set of brake shoes. These levers are actuated by expandable and contractable diaphragms. By the application of air under pressure on one side of these diaphragms the levers can be pivoted to apply a desired friction upon the brake disc. The pressure against the disc may be regulated by regulation of the air pressure against the diaphragms.

A further feature of the present invention resides in a provision of a disc brake which may be easily applied to and removed from a shaft or other similar rotatable member. The brake includes a brake disc which is mounted upon the shaft and a brake housing which is open on one side and may be applied to or removed from the brake disc. Accordingly, the brake housing may be merely lifted from disc encircling position when it is desired to change shafts.

A feature of the present invention resides in the provision of a disc brake including fluid actuated means for controlling the pressure of the brake shoes against the brake. These fluids actuated means are connected in such a manner that equal pressure is applied to each of fluid actuated means so as to equalize the pressure against the brake disc.

A further feature of the present invention resides in the provision of bearings of an unusual type which act to support the brake housing in disc encircling position. The bearings are formed of asbestos compound which resists the transfer of heat. Accordingly, the transfer of heat from the brake disc to the casing of the brake is minimized.

These and other objects and novel features of the present invention will be more clearly and fully set forth in the following specification and claims.

In the drawings forming a part of the specification:

Figure 1 is a perspective view of the disc brake showing the general arrangement of parts therein.

Figure 2 is a front elevational view of the disc brake shown in Figure 1.

Figure 3 is a sectional view through the brake disc and the portion of the housing encircling the same.

Figure 4 is a perspective view of the brake disc removed from the shaft.

As has been indicated, the disc brake which has been produced has many uses. Where this brake is used to resist the rotation of shafts on which rolls of paper are mounted, it is necessary to change shafts at intervals. In order that the laminating apparatus or other such structure operate as continuously as possible, it is usual practice to have a series of rolls of paper arranged on parallel shafts so that when the supply of paper on one roll is depleted, the paper from another roll may be fed into the laminating apparatus. Thereafter the shaft which supported the depleted roll is removed from its supports and a new roll of paper is placed thereon. This requires the removal of the brakes which apply the friction. It is therefore essential that the brake apparatus be readily removable when desired.

In usual practice in devices of this type the friction upon the disc may be applied by some means such as hand operated screws or other such means to apply pressure against the brake disc. It is accordingly necessary to release this pressure before the brake housing may be removed. With the present structure the brake automatically is released when the fluid pressure is released, thus considerably simplifying the operation.

The brake disc is indicated in general by the letter A. The brake includes a disc 10 of the type best illustrated in Figure 4 of the drawings. As shown in this figure, the disc includes a ring shaped body having a central hub 11 including a keyway 12 by means of which the disc may be held from rotation upon the shaft such as the shaft 13. The periphery of the ring-shaped body is provided with a series of radially extending pockets or apertures 14 which permit air to enter the interior of the disc and to cool the disc to some extent.

The disc 10 is normally mounted upon the shaft 13 and each shaft used with the brake is supplied with one such brake disc. In other words, if the shafts are changed, the brake disc is usually changed with the shaft.

The brake also includes a brake housing which is indicated in general by the numeral 15. This brake housing includes a generally rectangular body including parallel sides 16 and 17, and end connections 19 and 20 connecting the ends of the parallel sides 16 and 17. The sides 16 and 17 support inverted generally U-shaped bearing bosses 21 projecting outwardly therefrom in alignment. The upper ends of these bosses 21 are arcuate in shape to form a bearing support for the housing. The sides 16 and 17 are cut away inwardly of the bosses 21 so that the shaft 13 may extend through the bosses, and so that the housing may be lifted upwardly when the same is to be removed from the shaft 13.

A pair of arcuate brake shoe supports 22 are bolted or otherwise secured such as by the bolts 23 to the side 17 of the brake housing. These brake shoe supports 22 are provided with brake shoes 24 secured thereto. The brake shoes 24 are formed of a material capable of withstanding considerable heat and capable of applying friction to the surface 25 of the brake disc 10.

A pair of arcuate brake shoe supports 26 are mounted upon the ends of axially slidable studs 27 which extend through the side 16 of the housing 15. Two such studs 27 are supported by the housing side 16 on either side of the center thereof, and these studs 27 may slide axially through the apertures 29 in the housing side 16. Springs 30 are interposed between the housing side 16 and the nuts or old heads 31 on the studs 27. These springs 30 normally tend to hold the brake shoes 26 in spaced relation to the disc 10. Brake shoe surfaces 32 are mounted upon the brake shoe supports 26 and are constructed of material similar to that used for the brake shoes 24. The brake shoes 32 may be moved into surface contact with the surface 33 of the disc 10.

The housing sides 19 and 20 are provided with upwardly extending projections 34 and 35. These projections 34 and 35 act as supports for a pair of spaced parallel diaphragms 36 and 37. The diaphragms 36 and 37 are preferably pivotally secured to the projections 34 and 35. The diaphragms include shafts 39 and 40, respectively, which project from the sides of the diaphragms opposite the side supported by the projections 34 and 35. Upon expansion of the diaphragms 36 and 37 the shafts 39 and 40 are forced away from the projections 34 and 35. Contraction of the diaphragms moves these shafts 39 and 40 toward the projections 34 and 35.

The shafts 39 and 40 are pivotally connected at 41 and 42, respectively, to levers 43 and 44. These levers 43 and 44 are bifurcated to accommodate the flattened ends of the shafts 39 and 40 therebetween, the pivots 41 and 42 extending through these flattened ends 45 and 46, respectively. The bifurcated ends of the levers 43 and 44 also accommodate the flattened ends 47 and 49 of fixed supports 50 and 51 which are anchored to the frame side 16. Pivot bolts 52 and 53 extend through the levers 43 and 44 and through the flattened support ends 47 and 49 so as to pivotally support the levers intermediate the ends thereof.

The ends 54 and 55 of the levers 43 and 44 bear against studs 56 and 57 which extends through the housing side 16 and are anchored to the brake shoe supports 26. As a result the expansion of the diaphragms 36 and 37 causes a pivotal movement of the levers 43 and 44 which provide a force pushing inwardly on the studs 56 and 57. This force is transmitted to the brake shoe support 26 which tends to force the brake shoes 32 against the disc 10. As the brake shoe housing may move to some extent longitudinally of the shaft, pressure of the brake shoes 32 against the surface 33 of the disc 10 also causes a similar force to be exerted between the brake shoes 24 and the surface 25 of the disc. Thus pressure is applied to both sides of the disc, tending to resist rotation thereof.

Bearing brackets 59 and 60 are secured to opposite ends 19 and 20 of the housing 15. Pivots 61 and 62 extend through the bearing brackets 59 and 60 and through arms 63 and 64 to pivotally support the arms by the brackets. The axes of the bearings 61 and 62 are parallel. The arms 63 and 64 are provided with apertured ends 65 which may be swung into alignment and through which a pin 66 may be inserted to hold the arms from rotation relative to a fixed support 67 or the like.

The interior structure of the diaphragms 36 and 37 has not been illustrated as various types of structures are readily available for this purpose. The diaphragms are so arranged that when air or fluid is applied to suitable diaphragm connections, the shafts 39 and 40 are forced outwardly from the diaphragm casings to act against the levers 43 and 44 in a manner to apply pressure against the brake disc 10.

A tubular connection 69 acts to connect the two diaphragms. A common conduit 70 is connected to the tubular connection 69 to supply fluid thereto. It will be seen that both diaphragms are subjected to a similar pressure so that the force against the brake disc is equalized.

The operation of the device is as follows. The shaft 13, bearing the brake disc 10 is inserted in suitable bearings so that it may rotate freely. Normally, the shaft 13 supports a roll of paper when the brake is used in a laminating process. The bearings are not illustrated in the present application but are normally split bearings with removable top portions or the upper sides of the bearings may be open. Usually these bearings are supported by fixed supports such as 67.

The brake housing is next placed over the brake disc to enclose the same. As the bottom of the housing is open, it may be merely lifted up above the brake disc and lowered into place. The arms 63 and 64 are next swung so that their free ends are in alignment and a pin 66 is inserted through these ends of the arms and into the support 67 to hold the brake housing from rotation in either direction.

Fluid under pressure is then applied to the connection 70, the pressure being variable to provide the desired tension. The air pressure may be controlled automatically by a suitable apparatus or may be manually controlled. In case the brake is used to apply tension upon paper webs, the required braking pressure may well vary as the size of the roll of paper increases or decreases.

As the fluid pressure is applied, the diaphragms 36 and 37 operate to pivot the levers 43 and 44 in a direction to apply inward force upon the studs 56 and 57. As the brake housing is free to move to some extent longitudinally of the shaft, pressure applied against one side of the brake disc acts to apply approximately equal pressure from the opposite side.

As is usual in dealing with friction brakes, considerable heat is generated by the rubbing engagement of the brake shoes against the disc 10. As the friction surfaces are not directly connected to the casing, and as the brake shoes are made of material which is resistant to heat, the casing portion of the structure does not reach as high a temperature as the brake disc. In order to further insulate the bearing and to prevent the heat generated due to friction from quickly injuring the bearing or the shaft, a semi-cylindrical sleeve 71 of molded asbestos material which is highly resistant to heat is supported within the bosses 21 to act as bearing between the shaft and the housing. These asbestos bearings form an effective bearing structure in the particular environment in which they are found.

In accordance with the patent statutes, I have described the principles of construction and operation of my disc brake and while I have endeavored to set forth the best embodiment thereof, I desire to have it understood that obvious changes may be made within the scope of the following claims without departing from the spirit of my invention.

I claim:

1. A disc brake for use in resisting rotation of a rotatable shaft, the brake including a brake disc mounted upon the shaft for rotation in unison therewith, a brake disc housing having an open bottom side, bearings on opposite sides of said housing, said bearings encircling the upper side of the shaft on opposite sides of said brake disc so as to be supported thereby, the lower portions of said bearings being open so that said housing may be removed or applied to said shaft, brake shoes mounted within said housing and engageable against said disc, means for holding said housing from rotation, and fluid actuated means engageable with said brake shoes for urging the same against said disc.

2. The construction described in claim 1 and in which said brake shoes are supported for movement axially of said disc.

3. The construction described in claim 1 and including means suitably supporting said brake shoes for movement in an axial direction toward and away from said disc, annd including additional brake shoes supported within said housing on the opposite side of said disc.

4. A brake for use in resisting rotation of a rotatable shaft, the brake including a disc rotatably mounted upon said shaft for rotation therewith, a brake housing designed to at least partially encircle said disc, said housing having an open bottom side, means for holding said housing from rotation, bearings on opposite sides of said housing, said bearings encircling the upper side of said shaft on opposite sides of said disc, the lower portions of said bearings being open so that said housing may be removed or applied to said shaft, brake shoe means, means slidably supporting said brake shoe means for movement in an axial direction toward and away from said disc, lever means pivotally supported upon said housing, said lever means being engageable with said means for slidably supporting said brake shoes, and fluid actuated means for actuating said lever means.

5. The construction described in claim 4 and including resilient means for normally urging said brake shoes out of contact with said disc.

6. The construction described in claim 4 and in which said lever means comprises a pair of spaced levers, and said fluid actuated means comprises separate fluid actuated means operable in unison.

7. The construction described in claim 4 and including a semi-cylindrical bearing sleeve of asbestos material within said bearings.

8. The construction described in claim 4 and including brake shoe means on the side of said disc opposite said first brake shoe means and engageable with the opposite side of the disc when said first named brake shoe means are urged against said disc.

References Cited in the file of this patent

UNITED STATES PATENTS

| | | |
|---|---|---|
| 2,657,772 | Chamberlain | Nov. 3, 1953 |
| 2,754,936 | Butler | July 17, 1956 |

FOREIGN PATENTS

| | | |
|---|---|---|
| 701,918 | Great Britain | Jan. 6, 1954 |